US008429655B2

(12) United States Patent
Olson et al.

(10) Patent No.: US 8,429,655 B2
(45) Date of Patent: Apr. 23, 2013

(54) SYSTEM AND METHOD FOR ASYNCHRONOUS PROCESSING IN PAGE LIFECYCLE

(75) Inventors: Erik B. Olson, Farmington, UT (US); Andres Sanabria, Sammamish, WA (US); Dmitry Robsman, Bellevue, WA (US); Helen Yan, Bellevue, WA (US); Peixin Han, Bellevue, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1706 days.

(21) Appl. No.: 11/117,886

(22) Filed: Apr. 29, 2005

(65) Prior Publication Data

US 2006/0248207 A1 Nov. 2, 2006

(51) Int. Cl.
*G06F 9/46* (2006.01)
(52) U.S. Cl.
USPC .............................. 718/102; 718/100; 718/101
(58) Field of Classification Search ............... 718/1–108; 719/314
See application file for complete search history.

(56) References Cited

U.S. PATENT DOCUMENTS

| | | | | |
|---|---|---|---|---|
| 6,012,081 A | | 1/2000 | Dorn et al. ................... | 718/102 |
| 6,226,689 B1 | * | 5/2001 | Shah et al. ................... | 719/314 |
| 6,728,960 B1 | * | 4/2004 | Loomans ...................... | 718/102 |
| 7,162,723 B2 | | 1/2007 | Guthrie et al. ............... | 719/318 |
| 7,248,603 B1 | * | 7/2007 | Grunkemeyer et al. ...... | 370/466 |
| 7,516,195 B2 | * | 4/2009 | Collet et al. ................. | 709/218 |
| 7,580,975 B2 | | 8/2009 | Cheenath ..................... | 709/203 |
| 7,788,674 B1 | * | 8/2010 | Siegenfeld ................... | 719/313 |
| 7,788,675 B2 | * | 8/2010 | Messinger et al. ........... | 719/313 |
| 7,937,703 B2 | * | 5/2011 | Bethea et al. ................ | 718/101 |
| 2002/0184363 A1 | * | 12/2002 | Viavant et al. ............... | 709/224 |
| 2004/0143645 A1 | * | 7/2004 | Cheenath ..................... | 709/218 |
| 2005/0086359 A1 | * | 4/2005 | Banerjee et al. ............. | 709/232 |
| 2005/0149934 A1 | * | 7/2005 | Doolittle et al. ............. | 718/100 |
| 2006/0136921 A1 | * | 6/2006 | Becker et al. ................ | 718/100 |

OTHER PUBLICATIONS

Chang et al. "Web Browsing in a Wireless Environment: Disconnected and Asynchronous Operations in ARTour Web Express" (MOBICOM '97).*
Hu et al. "Measuring the Impact of Event dispatching and Concurrency Models on Web Server Performance Over High-speed Networks", Proceedings of the 2nd Global Internet mini-conference held in conjunction with GLOBECOM, Nov. 1997, pp. 1-12.*

(Continued)

*Primary Examiner* — Emerson Puente
*Assistant Examiner* — Willy W Huaracha
(74) *Attorney, Agent, or Firm* — Merchant & Gould (57) ABSTRACT

System and methods for asynchronous processing within a web page lifecycle, enabling web page developers to integrate asynchronous work within the web page implementation that can store state inside the page and is applied to requests to the particular page. Handlers initiate event-based or task-based asynchronous operations without keeping a dedicated thread while waiting for a response. The thread is returned to a pool of available threads upon initiation of the process. Results are received on other threads and provided to the page before rendering. Timeout errors are also provided, if a particular result is not received within specified period. The events are delivered in a serial manner so that the page developer uses request instance data without explicit synchronization. This makes a high-scale, asynchronous processing model less complex and more accessible to developers accustomed to web scripting, which is traditionally synchronous.

20 Claims, 9 Drawing Sheets

OTHER PUBLICATIONS

Zdun et al. "Design and Implementation of an Asynchronous Invocation Framework for Web Services", ICWS-Europe 2003, pp. 64-78.*

Chang, H., et al.; "*Web Browsing in a Wireless Environment: Disconnected and Asynchronous Operation in ARTour Web Express*"; Dec. 1998; AMMobiCom '97; 10 pgs.

Zdun, U., et al.; "*Design and Implementation of an Asynchronous Invocation Framework for Web Services*"; Jun. 2004; Vienna University of Economics, Austria; Ingenieurbro fur Softwaretechnologie, Germany; Siemems AG, Germany; 15 pgs.

MSDN; "*Chapter 10—Improving Web Services Performance*"; May 2004; accessed at http://msdn.microsoft.com/en-us/library/ms998562.aspx; 36 pgs.

Bogardi-Meszoly, A., et al.; "*Investigating Factors Influencing the Response Time in asp.net Web Applications*"; PCI 2005, LNCS 3746, Springer-Verlag Berlin Heidelberg 2005; accessed Oct. 14, 2009 at http://www.springerlink.com/content/k0g166wg8261x616/fulltext.pdf; 11 pgs.

MSDN; "*Handling Public Events*"; 2009 Microsoft Corporation; accessed Oct. 15, 2009 at http://msdn.microsoft.com/en-us/library/9ysfzy8h.aspx; 5 pgs.

\* cited by examiner

SYSTEM AND METHOD FOR ASYNCHRONOUS PROCESSING IN PAGE LIFECYCLE

BACKGROUND OF THE INVENTION

HyperText Transfer Protocol (HTTP) handlers take requests from a web page and process them in a predetermined fashion. There are a limited number of threads available to provide communication between a requesting client application and a web server. Synchronous HTTP handlers take a thread and keep it reserved for each request throughout the processing of that request. Once the request is completed by providing a result to the requesting application or a timeout, the reserved thread is returned to the available threads pool. Asynchronous HTTP handlers do not reserve the thread for the duration of the request and are, therefore, capable of serving many client requests with very few actual threads.

Asynchronous processing refers to the ability to perform some part of request on a separate thread or to temporarily defer it and to release the request processing thread to process another request. When used for non-CPU intensive tasks, such as network IO operations, this mechanism enables the maximization of the number of concurrent requests being processed by the system and enhancement of the perceived throughput of a server. In fact, depending on how intensely a handler-code uses asynchronous methods in its implementation, it is possible to peg the CPU(s) in a system using only a handful of threads while serving many times as many clients. Coding asynchronous processes is generally a complex and programming-intensive effort.

SUMMARY OF THE INVENTION

Aspects of the present invention relate to use of asynchronous processing within a page lifecycle, enabling page developers to integrate asynchronous work within the page implementation that can store state inside the page and is applied to requests to the particular page. The asynchronous handler implementation by a server application supports development of custom asynchronous request handlers, and integration of asynchronous processing in a standard page handler. Asynchronous operations may include a number of web related operations including, but not limited to, web services, database commands, and the like. Reference to any of these specific examples throughout the document is not intended to be in a limiting sense. Aspects described herein may be implemented with any asynchronous operation.

The ability to perform asynchronous processing directly within a page lifecycle implementation may significantly simplify the development model for asynchronous operations in page-related scenarios reducing the time to develop and stabilize the code.

In accordance with one aspect of the present invention, a computer-implemented method for providing asynchronous processing in a page lifecycle includes determining a request for an asynchronous operation from a web page being loaded and calling the asynchronous operation. Calling the asynchronous operation includes employing a thread from a pool of available threads and returning the thread to the pool after the call is initiated. The method further includes providing the result to the requesting web page, if a result is received in response to the called asynchronous operation.

According to another aspect, one or more computer-readable media include computer instructions for processing asynchronous tasks associated with a page. The instructions include registering at least one asynchronous task associated with the page while loading the page, with each asynchronous task associated with a begin handler, an end handler, and a timeout handler. The instructions further include calling a web service indicated by the begin handler associated with the asynchronous operation, if the asynchronous operation is registered in the web page.

The instructions also include retrieving a result in response to the called web service indicated by the end handler associated with the asynchronous task and providing the result to the requesting web page. According to a further aspect, the instructions include providing a timeout error to the requesting web page for the called web service indicated by the timeout handler associated with the asynchronous task, if a timeout occurs.

Aspects of the invention may be implemented as a computer process, a computing system (including but not limited to mobile computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
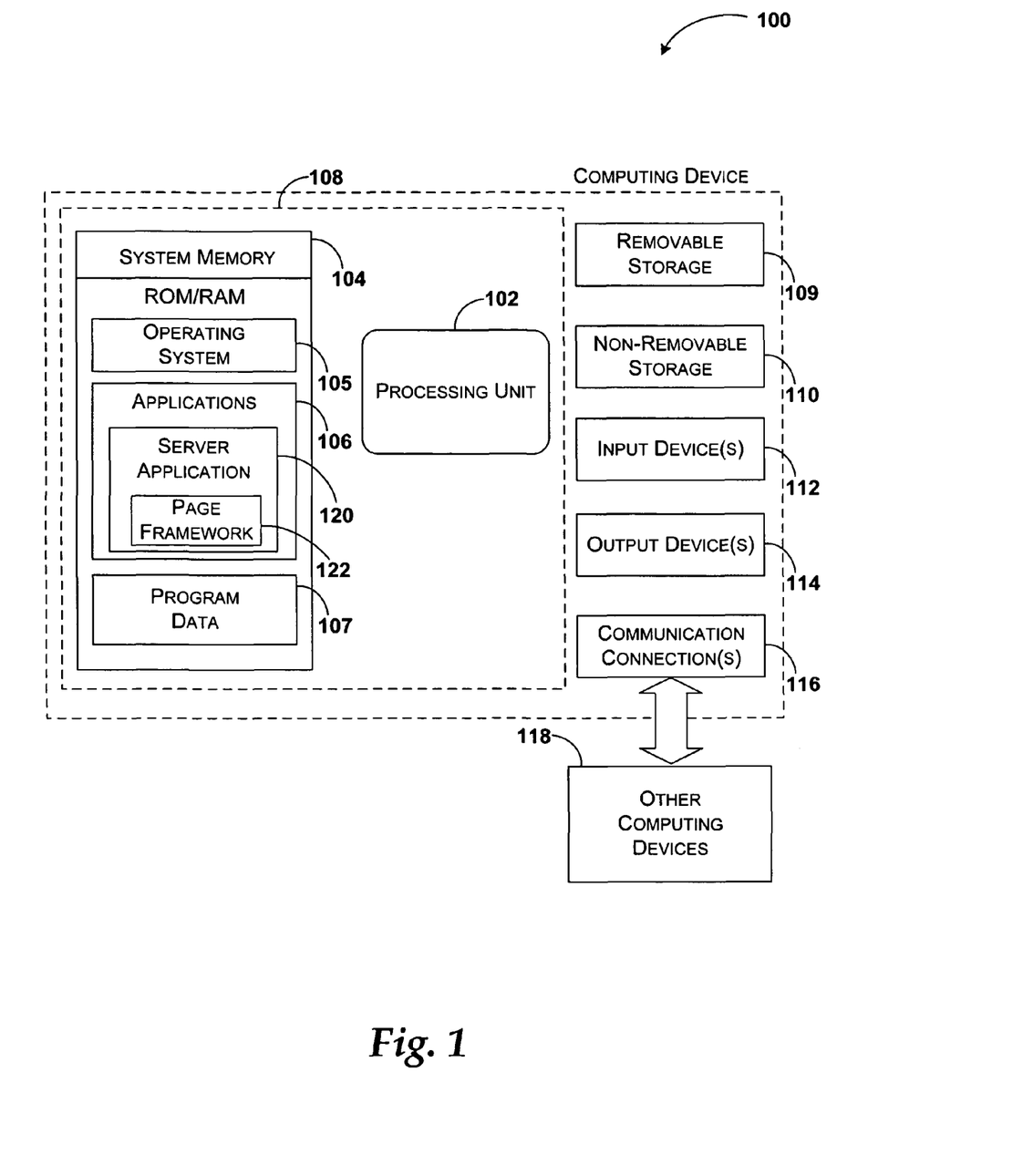
FIG. 1 illustrates a computing device that may be used according to an example embodiment.

Referring to FIG. 1, an example system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include server application 120, which provides web services to computer device 100 and other computing devices over a network. Server application 120 may include routing applications, load balancing applications, security applications, and the like. Server application 120 may be configured to process requests from other devices, to retrieve results for the requests and provide the results to requesting devices, or a combination of the two functionalities. In one embodiment, server application 120 may include page framework 122. Page framework 122 may render one or more web-related handling services client applications. The functionality represented by server application 120 may be further supported by additional input devices, 112, output devices 114, and communication connection(s) 116 that are included in computing device 100 for providing asynchronous processing over the network.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments For Providing Asynchronous Processing in Page Lifecycle Aspects of the present invention provide mechanisms to use asynchronous processing within a page lifecycle, enabling page developers to integrate asynchronous work within the page implementation that can store state inside the page and is applied to requests to the particular page. The asynchronous handler implementation by the server application supports development of custom asynchronous request handlers, and integration of asynchronous processing in a standard page handler.

The ability to perform asynchronous processing directly within a page lifecycle implementation may significantly simplify the development model for asynchronous operations in page-related scenarios reducing the time to develop and stabilize the code. The asynchronous framework provides proper synchronization of developer callbacks resulting from use of components supporting the new asynchronous component model. These events are delivered in a serial manner so that the page developer may use request instance data without explicit synchronization. This makes a high-scale, asynchronous processing model less complex and more accessible to developers accustomed to web scripting, which is traditionally synchronous.

Another important aspect of asynchronous tasks is that they enable writing of web page code that can perform several asynchronous operations during a single request. A further aspect includes the ability to automatically coordinate between several asynchronous tasks. For example, page execution only resumes after the last outstanding asynchronous task completes.

Processing requests may include retrieval of data from databases, access to other resources, network communication, and the like. Entities sending the requests and receiving the results may include mobile and stationary devices such as desktop PC's, laptop PC's, PDA's, or applications such web browsers.

Figure 2:
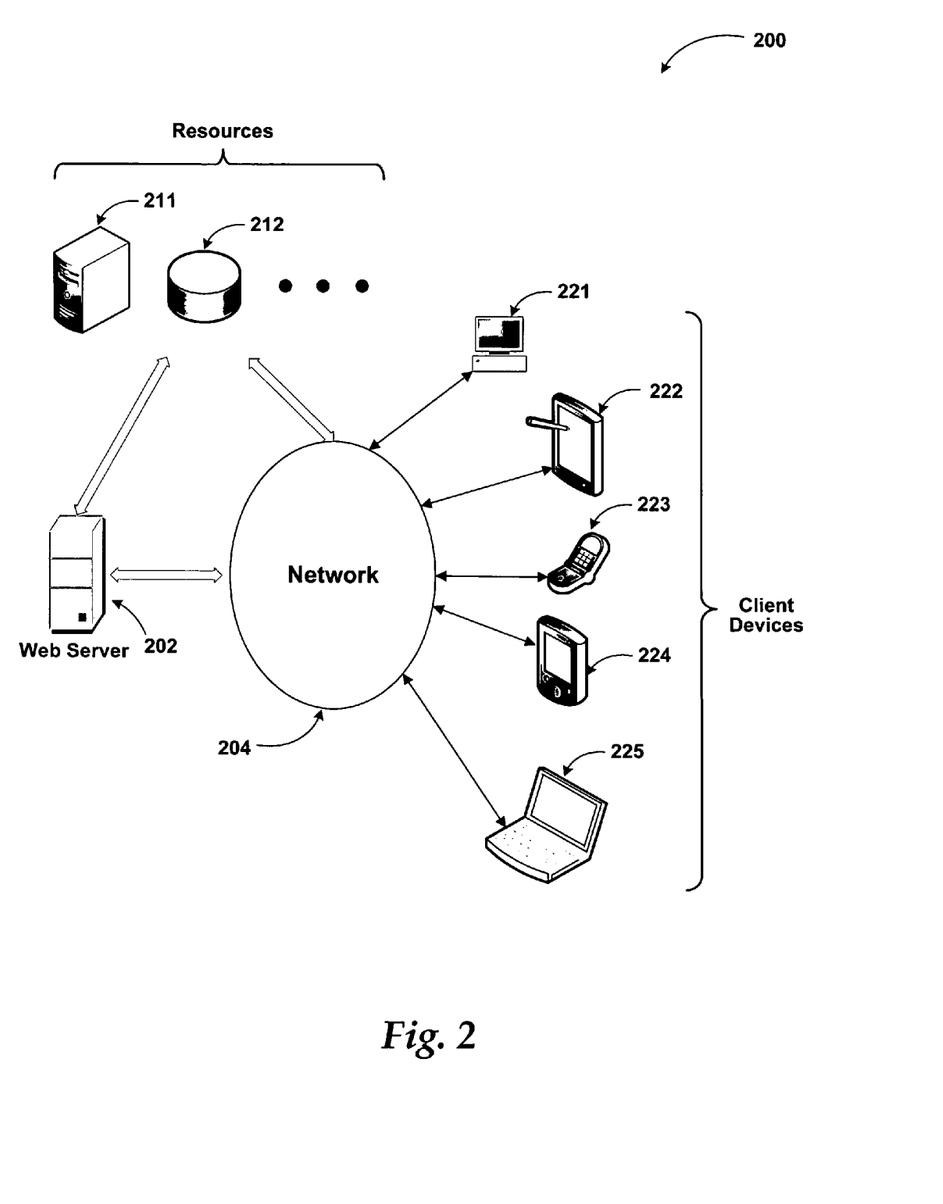
FIG. 2 illustrates an example system of client and resource devices managed by a web server over a network, where one example embodiment may be implemented.

FIG. 2 illustrates example system 200 of client and resource devices managed by a web server over a network, where one example embodiment of providing asynchronous processing in page lifecycle may be implemented.

System 200 may comprise any topology of servers, clients, Internet service providers, and communication media. Also, system 200 may have a static or dynamic topology without departing from the spirit and scope of the present invention.

System 200 includes at least one web server 202, which provides services to other nodes of network 204 that may include client devices 221-225 directly connected to network 204 such as tablet PC 221, smart phone 222, PDA 223, laptop PC 224, and client device/application 225. In one embodiment, nodes of network 204 may further include client devices (not shown), which are connected to network 204 through a subnet managed by another server (not shown). Services provided by web server 202 may include an application that handles request for resources for client devices 221-225.

Resources may include applications on other servers (or clients) such as server 211, database 212, and other applications on computing devices (not shown), where information is transferred to a recipient. Network 204 may be a secure network such an enterprise network, or an unsecure network such as a wireless open network.

Network 204 provides communication between the nodes described above. By way of example, and not limitation, network 204 may include wired media such as a wired network or direct-wired connection, and wireless media such as acoustic, RF, infrared and other wireless media.

In one example embodiment of the present invention, a web service provider application on web server 202 may receive requests from a web browser application on client device 221 and process the requests asynchronously minimizing a number of threads reserved for the web browser. Each thread may be returned to a pool of available threads once the action associated with the request is initiated. A result for the request or a timeout error may be provided to the web browser on a separate thread.

Figure 3:
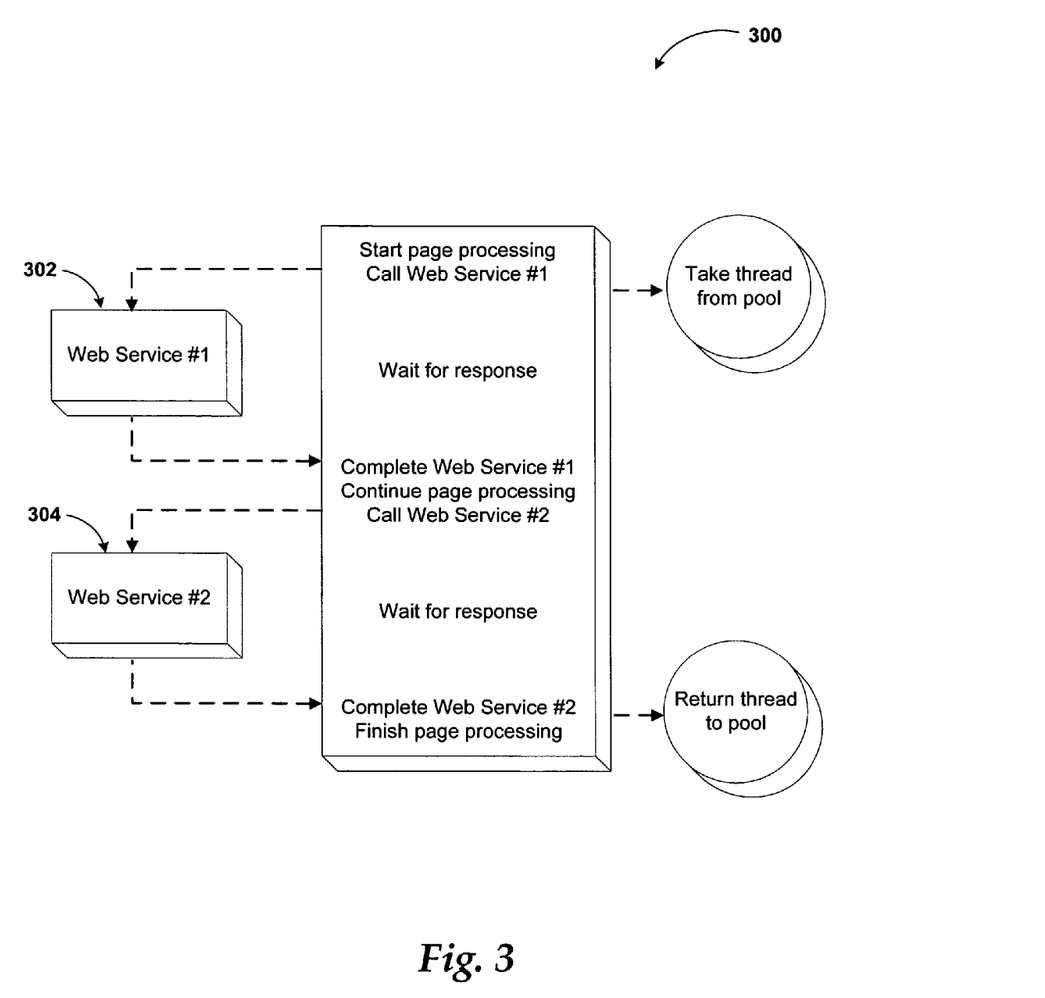
FIG. 3 is a conceptual diagram illustrating actions associated with example web services in synchronous processing.

FIG. 3 illustrates conceptual diagram 300 comprising actions associated with example web services in synchronous processing. The actions may be performed by a web server application residing in a web server such as web server 202 of FIG. 2.

In one example, a page may issue a request for a web service #1 (302). The web server application may begin processing the page and call web service #1, when it encounters the request. At that point, a thread is taken from a pool of available threads. The thread executing the page remains blocked while it waits for the response from the web service dedicated to the page. The web server then waits for a response to the request. When a result for the request for web service #1 is received, the web server continues processing the page.

During the processing of the page, the web server may issue another request for a web service, for example, web service #2 (304). Similar to the processing of web service #1, the request is processed, the web server waits until a response is received or a timeout error occurs. Then, the web server completes actions associated with web service #2 (304).

While the figure shows two example web services, the described process may be repeated for any number of web service requests in the page. Upon completion of the last web service, the web server returns the thread to the pool of available threads after it finishes processing the page.

The ordered processing of the web service requests and dedication of the thread to the process until the last web service is completed provide a simplified operation for the page. On the other hand, keeping the thread busy throughout the operation and waiting for each service to be completed before beginning another may result in considerable inefficiency for system resources such as processing capacity, memory, bandwidth, and the like.

Figure 4:
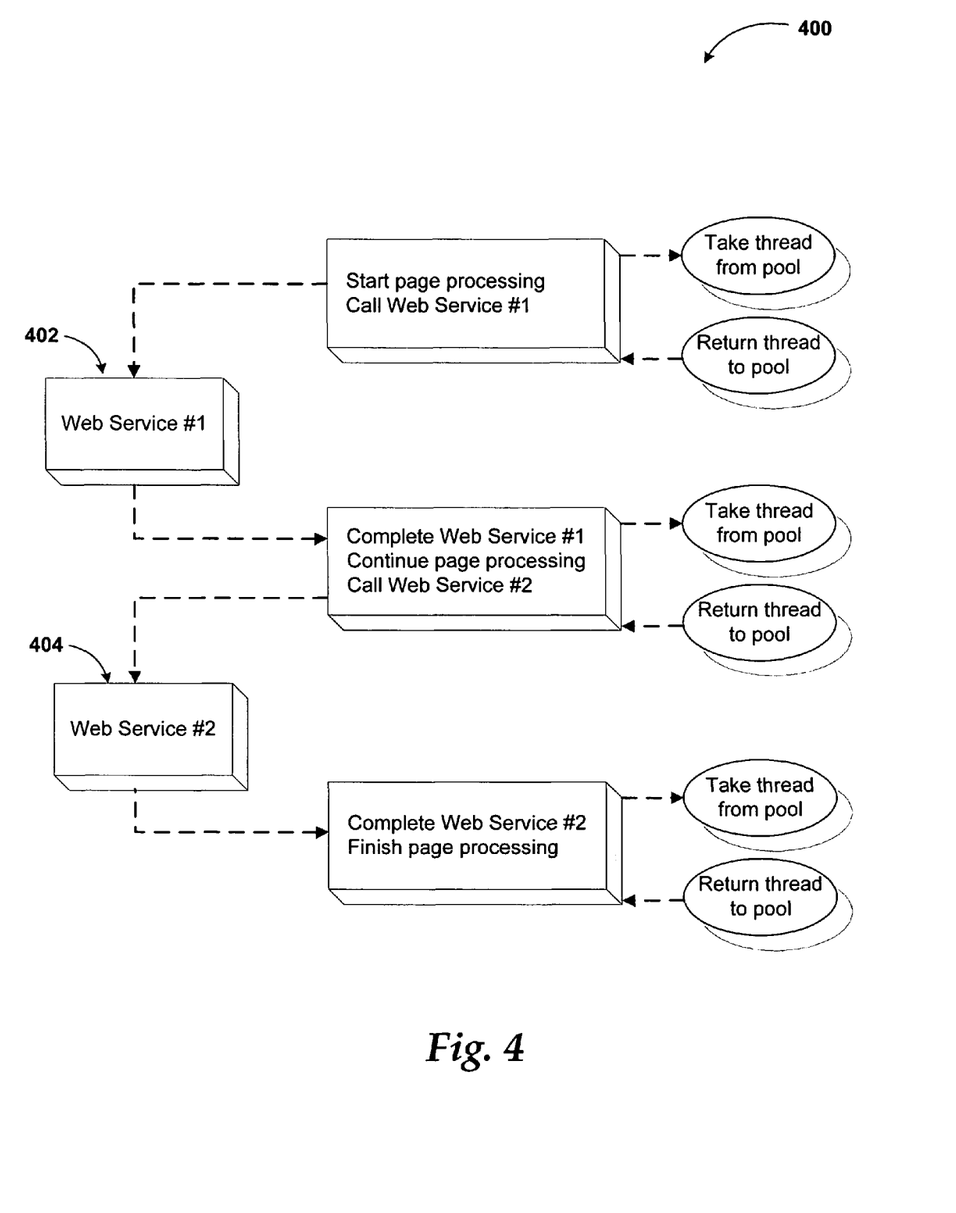
FIG. 4 is a conceptual diagram illustrating actions associated with example web services in asynchronous processing.

FIG. 4 is conceptual diagram 400 illustrating actions associated with example web services in asynchronous processing. The actions may be performed by a web server application residing in a web server such as web server 202 of FIG. 2.

In one embodiment, a page may issue a request for a web service #1 (402). The web server application may begin processing the page and call web service #1. Once the web service request is initiated (e.g. requesting data from another server), the thread is returned to the pool. When the result for the first request is received (e.g. the data for the other server retrieved), then another thread is taken from the pool. Processing continues and the actions are repeated, if another web service such as web service #2 (404) is encountered.

If web service #2 (404) is the last web service in the page, its completion is accompanied by finishing of the processing of the page and returning of the last thread. By taking and returning threads from the pool only to submit the requests and retrieve the results and not keeping them blocked while waiting for the results, the web server makes efficient use of the system resources.

By serializing the callbacks, the page framework enables page controls to work asynchronously while ensuring that all results are delivered in order. This allows a page developer to program the page without having to worry about thread-safety of the code.

Figure 5:
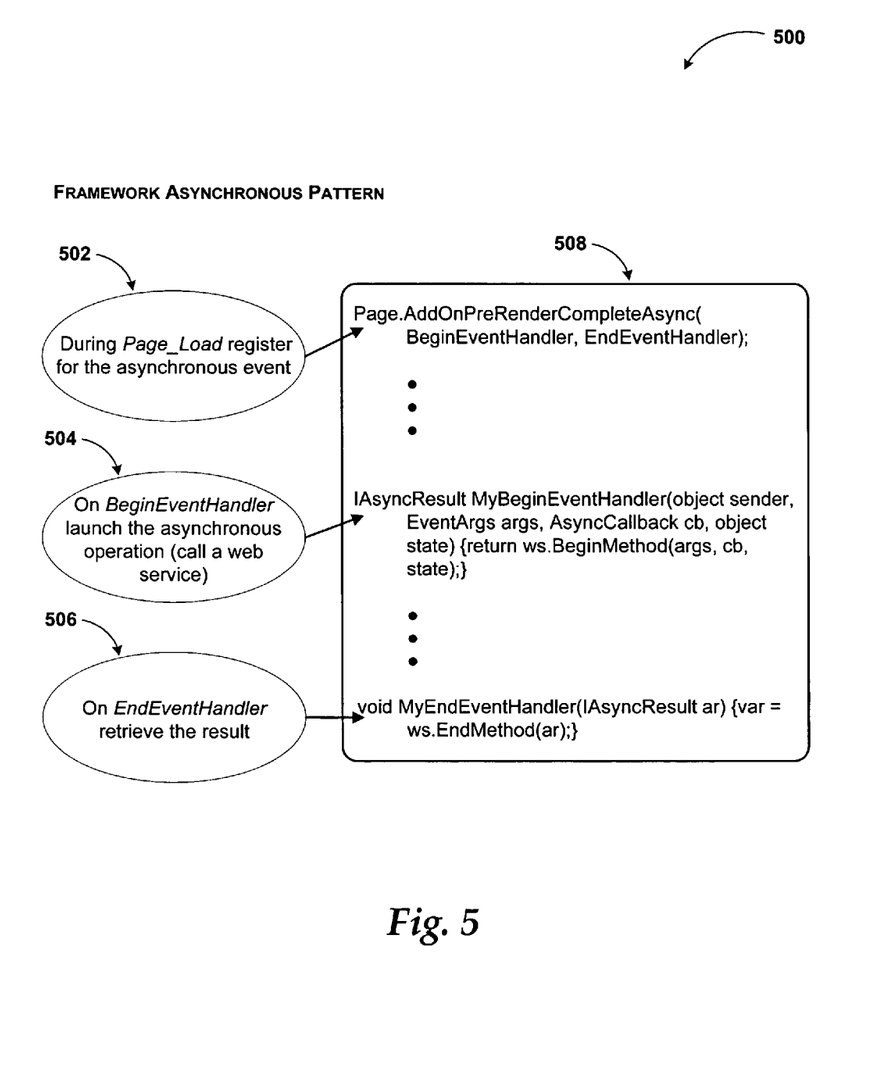
FIG. 5 is a diagram illustrating timing and actions associated with asynchronous processes according to one embodiment using a framework asynchronous pattern.

FIG. 5 includes diagram 500 illustrating timing and actions associated with asynchronous processes according to one embodiment using a framework asynchronous pattern.

Actions associated with processing a page may be categorized in following main groups:
 initiate
 load
 prerender
 render In a framework using asynchronous pattern, the asynchronous processes are initiated at prerendering and completed before rendering of the page. The asynchronous actions may include two main categories: call to start and call to get the result.

Example page code 508 includes code for calling the asynchronous process. This line triggers registration of the asynchronous event during page load (502). The code may include other commands following the calling line.

The next action associated with the asynchronous operation is triggered by code for beginning the event handler. The code may include various parameters related to the event handler. Action 504 launches the asynchronous operation such as calling a web service.

The asynchronous operation may end with either retrieval of the result of the called web service or by a network error (e.g. network timeout). Another code fragment in example page code 508 enables completion of the web service with either retrieval of the result or an error (506). As described before, the result may be provided through a different thread than the one used for submitting the request. The thread is not kept out of the pool of available threads throughout the process allowing efficient use of the system resources.

Figure 6:
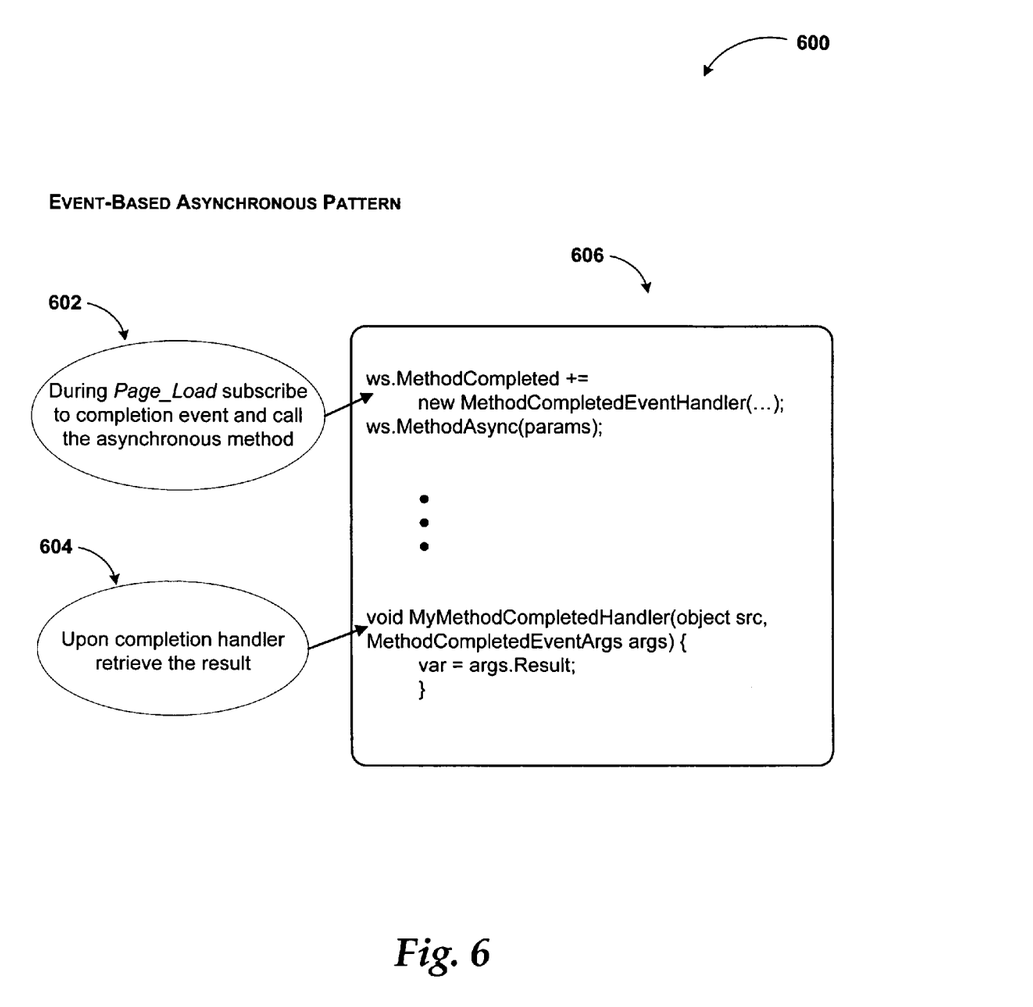
FIG. 6 is a diagram illustrating timing and actions associated with asynchronous processes according to another embodiment using an event-based asynchronous pattern.

FIG. 6 includes diagram 600 illustrating timing and actions associated with asynchronous processes according to another embodiment using an event-based asynchronous pattern.

Example page code 606 includes a line for subscribing to completion event and calling the asynchronous process. This line triggers registration of the asynchronous event before page load (602). The code may include other commands following the calling line.

Another line in example page code 606 enables completion of the web service with either retrieval of the result or by a network error (604). As described before, the result may be provided through a different thread than the one used for submitting the request. The thread is not kept out of the pool of available threads throughout the process allowing efficient use of the system resources.

Figure 7:
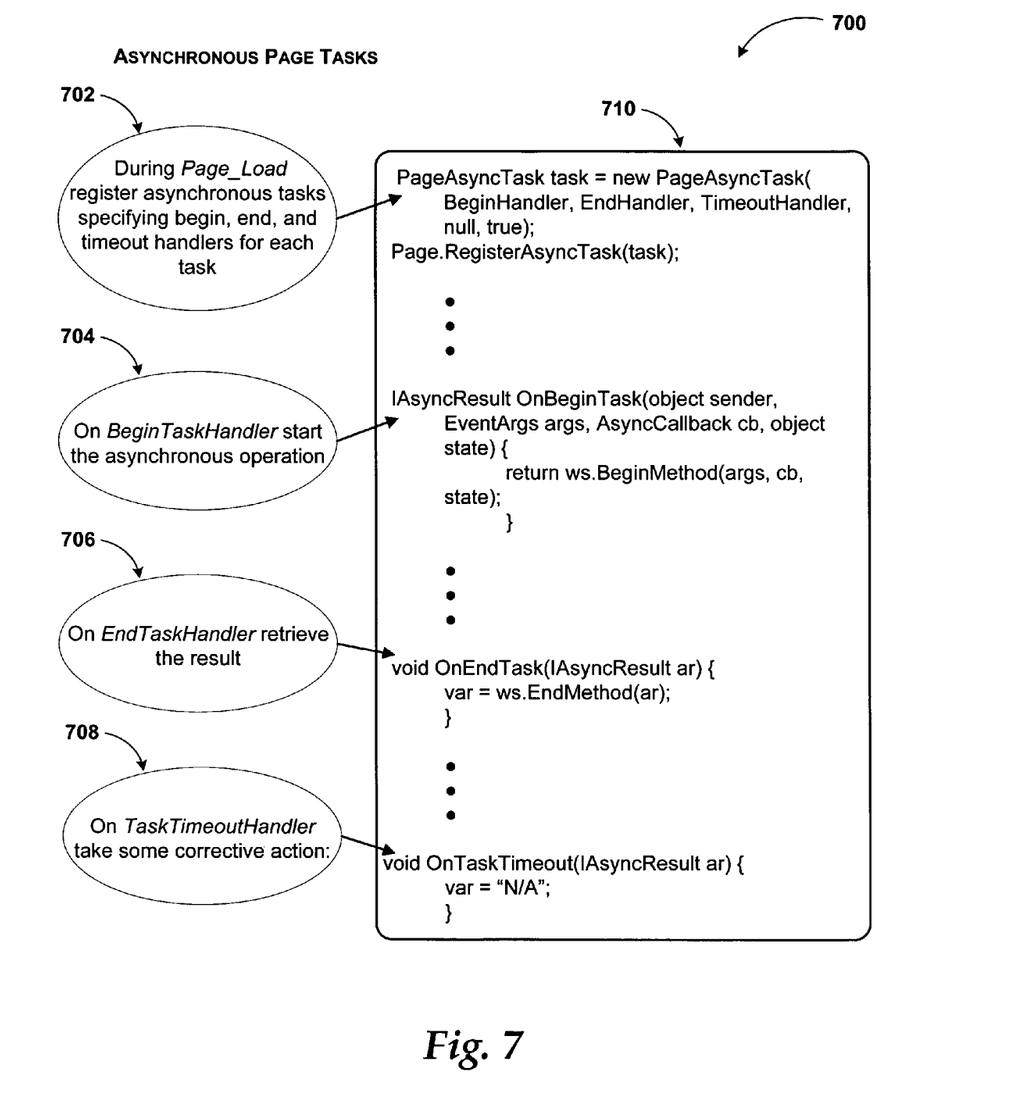
FIG. 7 is a diagram illustrating timing and actions associated with asynchronous processes according to a further embodiment using asynchronous page tasks.

FIG. 7 includes diagram 700 illustrating timing and actions associated with asynchronous processes according to a further embodiment using asynchronous page tasks. They are designed to enable multiple asynchronous calls, thus facilitating handling of several asynchronous request results without having to write relatively complex, orchestrating code. Asynchronous page tasks further enable use of individual timeouts for each task. Moreover, employing asynchronous tasks, mainly synchronous pages may be processed within the asynchronous framework as well. The latter method allows more efficient use of system resources and optimization of page-rendering time while maintaining the page's mainly synchronous nature. The asynchronous tasks include the additional main category: call if a timeout occurs.

Example page code 710 includes code for subscribing the asynchronous tasks associated with the page. This line triggers registration of the asynchronous tasks during page load (702). The registration specifies begin-, end-, and timeout-handlers for each task. The code may include other commands following the registration line.

For each task there is a code line that starts the asynchronous operation (704) (e.g. BeginTaskHandler). Similar to the asynchronous operations explained previously, a thread is taken from the pool before page starts processing. When all tasks have been started, then the thread is returned to the pool.

Another line in example page code 710 enables completion of the web service associated with the asynchronous task with retrieval of the result (706). As described before, the result may be provided through a different thread than the one used for submitting the request. The thread is not kept out of the pool of available threads throughout the process allowing efficient use of the system resources.

A further line in example page code 710 enables completion of the web service associated with the asynchronous task based on a timeout error (708). In addition to other system/network timeouts, an asynchronous process timeout may be specified either by the page developer or by the server application. If a result is not retrieved within the specified time period, the requesting page is provided with the timeout error and the requested execution continues. In one embodiment, the server may be configured such that a result arriving after the timeout period is not forwarded to the page anymore and its integrity protected, because the page is assumed to have moved on to other processes.

Figure 8:
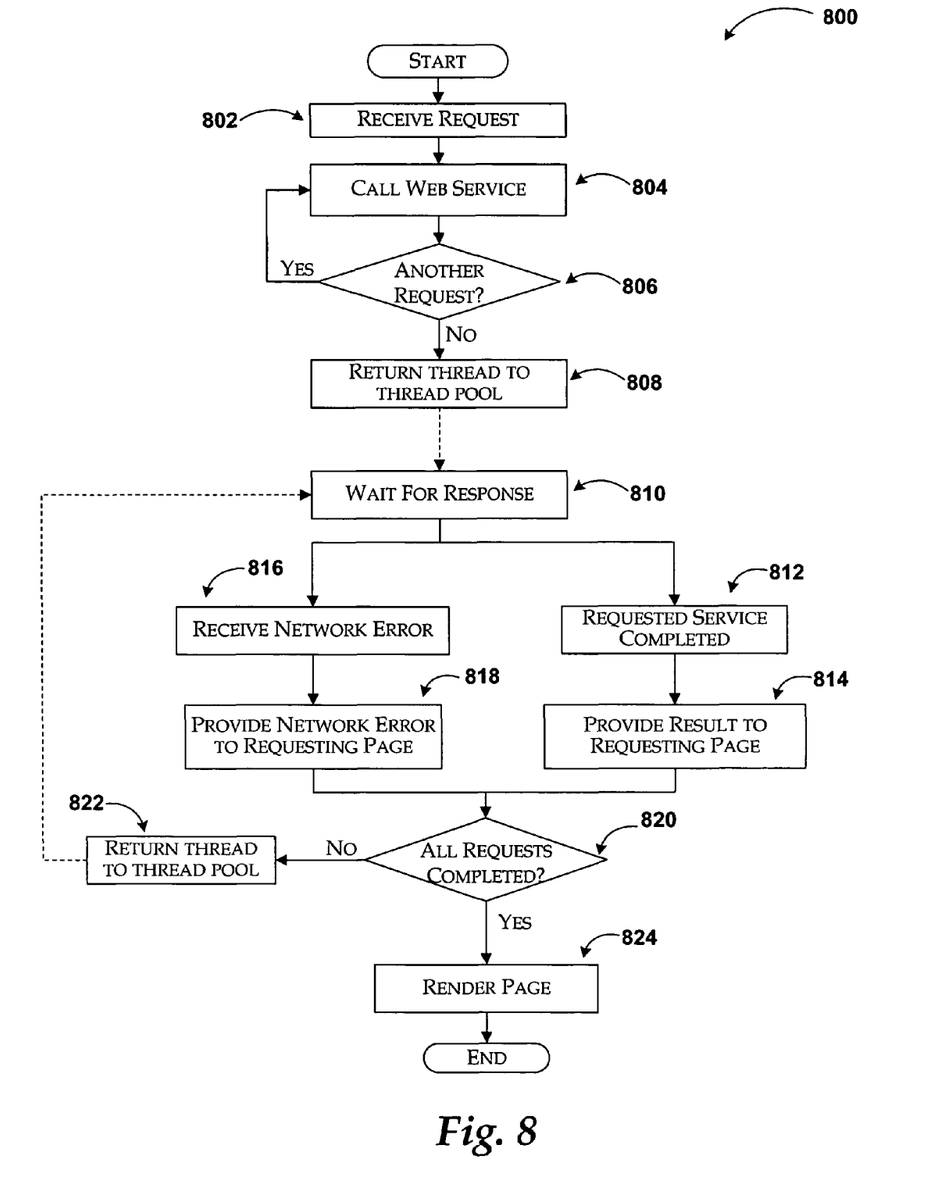
FIG. 8 is a logic flow diagram illustrating an operational flow for providing asynchronous processing of a web document according to one example embodiment.

FIG. 8 is a logic flow diagram illustrating operational flow 800 for providing asynchronous processing of a web document according to one example embodiment. Process 800 may be implemented in a server application such as server application 120 of FIG. 1. Process 800 starts at block 802 where a page is loaded to be processed. A thread is taken from a pool of available threads during the loading of the page. The page may issue a request for a web service. Processing proceeds to block 804 next.

At block 804, the server application initiates a call for the web service. Upon completing the initiation of the call for the web service (e.g. sending a request for download to a database), the thread is returned to the pool and not blocked until a response is received for the web service. Processing then moves to decision block 806.

At decision block 806, a determination is made whether another web service request is issued by the page code. If the page contains another request for a web service, processing returns to block 804. If no other request is encountered, processing advances to decision block 806.

At decision block 806, a determination is made whether a response is received for the web service. If another request is received, processing returns to block 804 to call another web service before the thread is returned. Otherwise, processing proceeds to block 808, where the thread is returned to the pool of threads.

Processing then advances to block 810, where the web server waits for a response. The wait for a response may be followed by one of two paths. The first path begins with receiving a result in response to the completed web service at block 812. From block 812, processing moves to block 814, where the result is provided to the requesting page.

The second path begins with the web server receiving a network error at block 816. The network error may include a network timeout, a communication error, and the like. Processing advances to block 818 next. At block 818, the network error is provided to the requesting page.

From blocks 814 and 818, processing moves to decision block 820. At decision block 820, a determination is made whether all requests are completed. If there are remaining responses, processing moves to block 822, where the thread that is employed for receiving the response is returned to the thread pool. After block 822, processing returns to block 810 to wait for further responses.

If the decision at block 820 is affirmative, processing moves to block 824, where the page is rendered. Processing then moves to a calling process for further actions.

Figure 9:
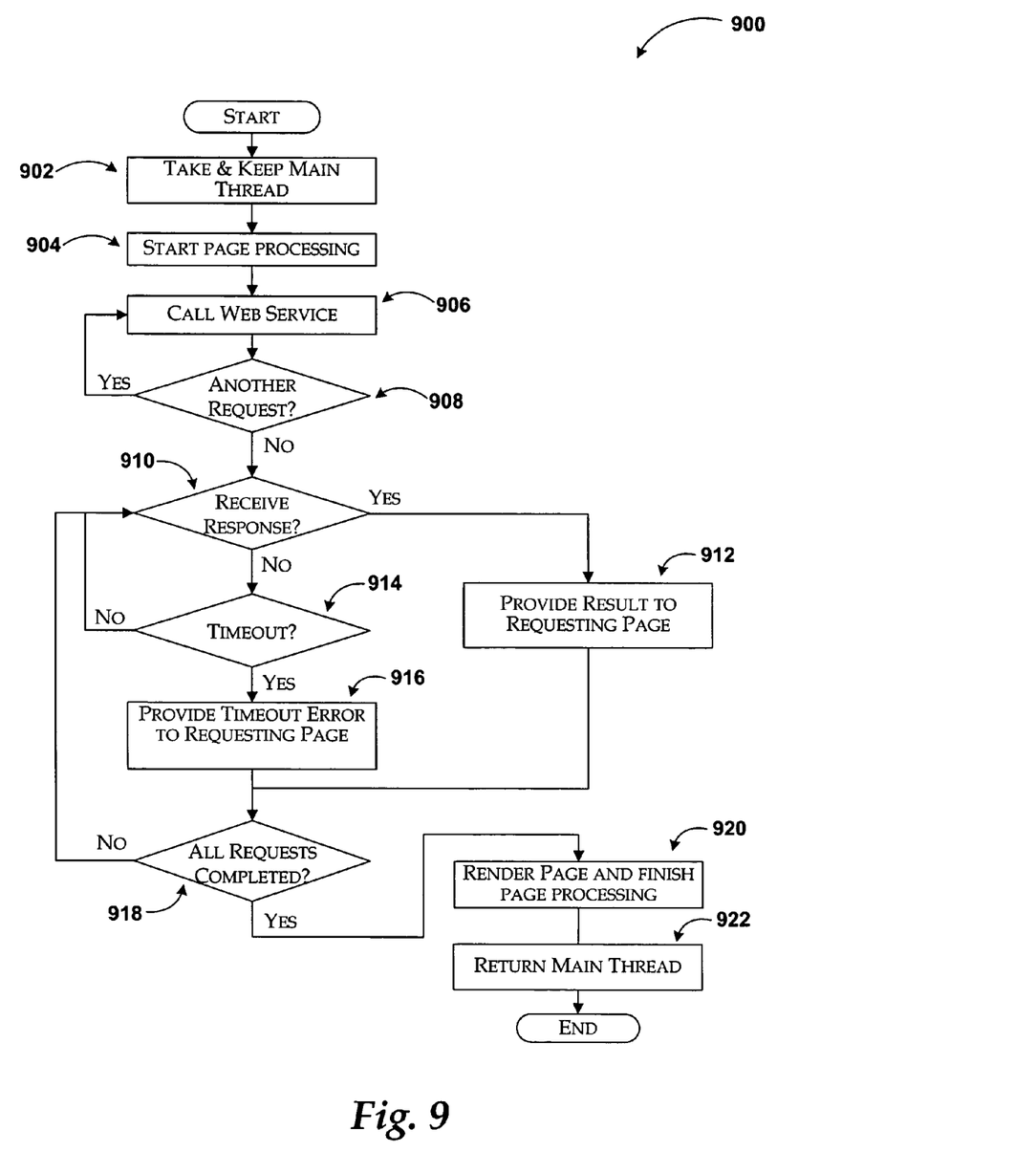
FIG. 9 is a logic flow diagram illustrating an operational flow for providing asynchronous processing of a synchronous web document according to another example embodiment.

FIG. 9 is a logic flow diagram illustrating operational flow 900 for providing asynchronous processing of a mainly synchronous web document according to another example embodiment. Process 900 may be implemented in a server application such as server application 120 of FIG. 1.

A mainly synchronous web document includes mostly synchronous tasks, but may also include some asynchronous tasks. In another embodiment, some of the synchronous tasks may be performed as asynchronous tasks by the server application managing the web document.

Process 900 starts at block 902 where a main thread is taken and kept for the synchronous web document to be processed. Processing proceeds to block 904 next. At block 904, the web document is loaded and page processing begins. During the loading of the document, handlers for asynchronous tasks associated with the document may also be registered by the server application. Such handlers may include begin-, end-, and timeout-handlers. Page processing may include a request for a web service. Processing moves from block 904 to block 906.

At block 906, the server application initiates the call for the first web service. For this action, the server application may take a thread from a pool of available threads. Upon completion of the call for the web service (e.g. sending a request for current information to a weather information server), the thread is returned to the pool and not blocked until a response is received for the first web service. Processing then moves to decision block 908.

At decision block 908, a determination is made whether another request is encountered in the document. If the document contains another request for a web service, processing returns to block 906. If no other request is encountered, processing advances to decision block 910.

At decision block 910, a determination is made whether a response is received for the web service. In case of multiple requests the actions described in blocks 910 through 916 may be repeated for each request. If the response is received, processing moves to block 912, else processing advances to decision block 914.

At block 912, the server application provides the response to the requesting document. Using asynchronous tasks, the response may be provided using a different thread than the one used for initiating the web service. The thread employed for providing the response is returned to the thread pool upon completion of the web service. From block 912, processing proceeds to decision block 918.

At decision block 914, a determination is made whether a predetermined asynchronous processing timeout has occurred. If the timeout has not occurred yet, processing returns to decision block 910. If the timeout has occurred, processing moves to block 916.

At block 916, a timeout error is provided to the requesting client. Similar to the received response, a different thread may be employed and returned to the thread pool for this action.

From block 916, processing advances to decision block 918. At decision block 918, a determination is made whether all requests have been processed. If all requests have not yet been processed, processing returns to block 910, else processing advances to block 920.

At block 920, the page is rendered and page processing tasks completed. Processing next proceeds to block 922, where the main thread for the synchronous web document is returned. Processing then moves to a calling process for further actions.

Processes 800 and 900 are example embodiments for illustration purposes. The invention is not limited to the flowchart blocks or the order of blocks of processes 800 and 900. Other embodiments of the present invention may be implemented in another process with fewer or additional blocks and in other orders without departing from the scope and spirit of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing asynchronous processing in a page lifecycle, comprising:
   receiving at a web server a request from a client to load a web page, wherein code for the web page includes an asynchronous operation; wherein the code for the asynchronous operation comprises a first code for beginning the asynchronous operation and a second code for retrieving a result of the asynchronous operation when completed;
   the web server taking a first thread from a pool of available threads to begin the asynchronous operation; wherein the first thread is any thread that is available within the pool;
   the web server calling the first code for beginning the asynchronous operation using the first thread,
   the web server returning the first thread to the pool after the call is initiated and before the result is received in response to the called asynchronous operation; wherein the first thread after being returned is available for use by other processes;
   the web server waiting for a response that was made by the web server to the called asynchronous operation;
   if the result is received in response to the called asynchronous operation, the web server taking a second thread from a pool of available threads, using the second thread for calling the second code for retrieving the result of the asynchronous operation, and, the web server providing the result to the requesting web page at the client.

2. The method of claim 1, further comprising:
   if an error is received in response to the called asynchronous operation, providing the error to the requesting web page.

3. The method of claim 2, wherein the error is one of a network communications error and a network timeout error.

4. The method of claim 1, wherein the result is received on a different thread than the thread employed for calling the asynchronous operation.

5. The method of claim 1, further comprising determining at least one other request for an additional asynchronous operation and providing one of a result and an error to the requesting web page in response to the at least one other request.

6. The method of claim 5, wherein the results and the errors in response to the requests are provided asynchronously to the requesting web page.

7. The method of claim 5, wherein an asynchronous process handler is registered for each asynchronous operation request when the web page is loaded and all requests are processed before the web page is rendered.

8. The method of claim 1, wherein the asynchronous operation includes use of a resource over a network.

9. The method of claim 1, wherein the asynchronous operation includes at least one of a web service, a database command, and a network I/O operation.

10. A computer-readable storage medium having computer instructions for processing asynchronous tasks associated with a web page, the instructions comprising:
    at a web server, registering at least one asynchronous task specified by code within with the web page that is associated with a client while loading the web page, wherein each asynchronous task comprises a first code within the web page for a begin handler, a second code for an end handler, and a third code for a timeout handler;
    when an asynchronous task is registered in the web page, the web server taking any available thread in a thread pool for calling a web service indicated by the begin handler associated with the asynchronous task;
    returning the taken thread to the thread pool;
    when the web service completes successfully, the web server taking any available thread in a thread pool for retrieving a result in response to the called web service indicated by the end handler associated with the asynchronous task made by the web server and the web server providing the result to the requesting web page, returning the taken thread to the thread pool; and
    if a timeout occurs, providing a timeout error to the requesting page for the called web service indicated by the timeout handler associated with the asynchronous task.

11. The computer-readable storage medium of claim 10, wherein at least one of retrieving a result in response to the called web service and providing a timeout error include employing a thread from the pool of available threads that is different from a thread employed to call the web service and returning the thread to the pool upon completion of the asynchronous task.

12. The computer-readable storage of claim 11, wherein the at least one asynchronous task is issued in a web page that is a synchronous page.

13. The computer-readable storage medium of claim 12, wherein a main thread associated with the synchronous page is reserved for the page until all asynchronous tasks are processed, and wherein additional threads associated with asynchronous tasks are returned to the pool upon completion of each associated asynchronous task.

14. A web server for providing asynchronous processing to a web page, comprising:
- a memory that is arranged to:
  - store information associated with a web page to be executed by the web server;
- an I/O device that is arranged to:
  - during a loading of the web page, receive a request from a client that is associated with one or more asynchronous tasks encoded directly into the web page;
- wherein each asynchronous task encoded directly in the web page comprises a first code for beginning the asynchronous operation and a second code for retrieving a result of the asynchronous operation when completed; and
- a processor that is arranged to:
- call the one or more asynchronous tasks, wherein calling the one or more asynchronous tasks includes the web server employing at least one thread from a pool of available threads and the web server returning the at least one thread to the pool upon completion of the call and the web server waiting for a response that was made by the web server to the called one or more asynchronous tasks.

15. The web server of claim 14, wherein the asynchronous operation includes at least one of a web service, a database command, and a network I/O operation.

16. The web server of claim 14, wherein the processor is further arranged to:
- provide a result to the web page, if the result is received in response to the called asynchronous task within a predetermined time period; and
- render the web page when all results in response to the one or more asynchronous tasks are received.

17. The web server of claim 16, wherein the processor is further arranged to:
- provide a timeout error to the web page, if the result is not received in response to the called asynchronous task within the predetermined time period.

18. The web server of claim 16, wherein the processor is further arranged to receive the result on a different thread than the thread employed for calling the asynchronous task.

19. The web server of claim 14, wherein the web page is a synchronous page.

20. The web server of claim 19, wherein a main thread associated with the synchronous page is reserved for the web page until all web services are processed, and wherein additional threads associated with asynchronous web services are returned to the pool upon completion of each associated asynchronous web service.

* * * * *